(12) United States Patent
Bevan et al.

(10) Patent No.: US 10,794,256 B2
(45) Date of Patent: Oct. 6, 2020

(54) CONTROL OF AFTERTREATMENT OF AN INTERNAL COMBUSTION ENGINE

(71) Applicant: JAGUAR LAND ROVER LIMITED, Coventry, Warwickshire (GB)

(72) Inventors: Neil Bevan, Warwickshire (GB); Alex Romocea, Warwickshire (GB)

(73) Assignee: JAGUAR LAND ROVER LIMITED, Coventry, Warwickshire (GB)

( * ) Notice: Subject to any disclaimer, the term of this patent is extended or adjusted under 35 U.S.C. 154(b) by 0 days.

(21) Appl. No.: 16/093,510

(22) PCT Filed: Mar. 21, 2017

(86) PCT No.: PCT/EP2017/056730
§ 371 (c)(1),
(2) Date: Oct. 12, 2018

(87) PCT Pub. No.: WO2017/178199
PCT Pub. Date: Oct. 19, 2017

(65) Prior Publication Data
US 2019/0162102 A1 May 30, 2019

(30) Foreign Application Priority Data
Apr. 15, 2016 (GB) .................................. 1606583.1

(51) Int. Cl.
*F01N 9/00* (2006.01)
*F01N 3/08* (2006.01)
(Continued)

(52) U.S. Cl.
CPC ........... *F01N 9/005* (2013.01); *B01D 46/006* (2013.01); *B01D 46/0027* (2013.01);
(Continued)

(58) Field of Classification Search
CPC ............. F01N 9/005; F01N 2900/0601; F01N 2900/1404; F01N 2900/1411
See application file for complete search history.

(56) References Cited

U.S. PATENT DOCUMENTS 5,938,715 A * 8/1999 Zhang .................... F01N 3/32
60/277
2006/0241850 A1 10/2006 Barrillon et al.
(Continued)

FOREIGN PATENT DOCUMENTS

EP  2182191 A1  5/2010
GB  2470391 A   11/2010

OTHER PUBLICATIONS

International Search Report and Written Opinion, PCT/EP2017/056730, dated Jul. 20, 2017, 18 pages.
(Continued)

*Primary Examiner* — Jonathan R Matthias
(74) *Attorney, Agent, or Firm* — Miller Nash Graham & Dunn LLP

(57) ABSTRACT

Apparatus (100) for controlling an aftertreatment system of an internal combustion engine (101), a system comprising an apparatus, a vehicle comprising a system and a method (1000) of controlling injection in an internal combustion engine (101) are disclosed. The apparatus comprises a processing means (102) configured to receive a first signal from a first temperature sensing means (103) indicative of a first temperature of exhaust gases outputted from an internal combustion engine (101) at a first location upstream of a first exhaust system component (104) configured to provide a passage for exhaust gases. The processing means is also configured to receive a second signal from a flow rate sensing means (105) indicative of a flow rate of the exhaust gases outputted from the engine (101) and calculate an approximated value at least from the first signal and the
(Continued)

second signal. The approximated value is indicative of a second temperature of exhaust gases at a location downstream of the first exhaust system component (104). The processing means is further configured to provide an output signal to control the after treatment system, in dependence of the calculated approximated value.

20 Claims, 12 Drawing Sheets

(51) Int. Cl.
*F01N 3/10* (2006.01)
*F01N 3/20* (2006.01)
*F01N 3/021* (2006.01)
*F01N 3/025* (2006.01)
*B01D 46/00* (2006.01)
*B01D 53/94* (2006.01)
*F01N 3/035* (2006.01)
*F02D 41/02* (2006.01)
*F02D 41/30* (2006.01)

(52) U.S. Cl.
CPC ....... *B01D 53/944* (2013.01); *B01D 53/9431* (2013.01); *B01D 53/9495* (2013.01); *F01N 3/021* (2013.01); *F01N 3/0253* (2013.01); *F01N 3/035* (2013.01); *F01N 3/0814* (2013.01); *F01N 3/0821* (2013.01); *F01N 3/0842* (2013.01); *F01N 3/103* (2013.01); *F01N 3/208* (2013.01); *F01N 3/2066* (2013.01); *F01N 9/00* (2013.01); *F01N 9/002* (2013.01); *F01N 9/007* (2013.01); *F02D 41/0235* (2013.01); *F02D 41/3005* (2013.01); *B01D 2279/30* (2013.01); *F01N 2900/1404* (2013.01); *F01N 2900/1411* (2013.01); *F01N 2900/1606* (2013.01); *Y02A 50/2325* (2018.01); *Y02T 10/24* (2013.01); *Y02T 10/47* (2013.01)

(56) References Cited

U.S. PATENT DOCUMENTS

2013/0204508 A1    8/2013  Whitt et al.
2015/0090020 A1*   4/2015  Takita .................. F01N 11/002
                                                    73/114.75

OTHER PUBLICATIONS

Search and Examination Report, GB1606583.1, dated Nov. 18, 2016, 8 pages.

* cited by examiner $$\rho_g C_{pg} v_g \frac{\partial T_g}{\partial x} = -h \cdot \frac{Sf}{\varepsilon} \cdot (T_g - T_b) + \dot{Q}_{react} \qquad (1)$$

$$h = Nu \cdot \lambda_g / d_h \qquad (2)$$

$$Nu = Nu_L \cdot [(1 + n1)^{bh} - bh \cdot n1 \cdot (1 + n1)^{bh-1}] \qquad (3)$$

$$n1 = ah/G_{zD} \qquad (4)$$

$$G_{zD} = z/(d_h \cdot Re \cdot Pr) \qquad (5)$$

| Channel Shape | $Nu_L$ |
|---|---|
| Square | 2.976 |
| Triangular | 2.49 |
| Hexagonal | 3.34 |

Fig. 4

$$\rho_b \cdot C_{pb} \cdot \frac{\partial T_b}{\partial t} = \lambda_{b,x} \frac{\partial^2 T_b}{\partial x^2} + \lambda_{b,y} \frac{\partial^2 T_b}{\partial y^2} + \dot{Q}_{conv} + \dot{Q}_{react} + \dot{Q}_{el} \quad (6)$$

$$\rho_b = \rho_w \cdot \varepsilon_w + \rho_c \cdot \varepsilon_c \quad (7)$$

$$\rho_c \cdot \varepsilon_c = \underline{m}_c \quad (8)$$

$$\rho_b \cdot C_{pb} = \rho_w \cdot \varepsilon_w \cdot C_{pw} + C_{pc} \cdot \varepsilon_c \cdot \rho_c \quad (9)$$

$$Q_{conv} = h \cdot S_F \cdot (T_g - T_b) \quad (11)$$

Fig. 5

$$Q_{react} = SF \cdot \Sigma_K (R_k dH_k) \quad (12)$$

$$R_k = K(t) \cdot [C_A] \quad (13)$$

$$K(t) = A \cdot exp(-E/(RT)) \quad (14)$$

Fig. 6

$$\frac{dP}{dx} = -\frac{28.5 \cdot \mu \cdot v_g}{d_h^2} \qquad (15)$$

$$v_g = mfr/(\rho_g \cdot A_{monolith} \cdot \varepsilon) \qquad (16)$$

$$\Delta P_{contraction} = (1.1 - 0.4 \cdot C_x) \cdot (\rho_g \cdot v_g)^2/2 \qquad (17)$$

$$\Delta P_{expansion} = (1 - C_x) \cdot (\rho_g \cdot v_g)^2/2 \qquad (18)$$

$$C_x = \frac{d_h^2}{2 \cdot (d+w_w)^2} \qquad (19)$$

$$\Delta P_{diffuser} = (1 - A_{in}/A_{out})^2 \cdot mfr^2 / (\rho_{in} \cdot A_{sec}^2) \qquad (20)$$

Fig. 7

$$\frac{\partial T_{IN}}{\partial t} = \frac{\partial T_{OUT}}{\partial t} + \frac{\partial(\frac{\dot{Q}}{\dot{m} \cdot C_p})}{\partial t} \qquad (23)$$

Fig. 8

$$T_{OUT} = \frac{\dot{m} \cdot Cp \cdot T_{IN} - h_{EG,Pipe} \cdot A \cdot (T_{IN} - T_{wall})}{\dot{m} \cdot Cp} \tag{24}$$

$$h_{EG,Pipe} = \frac{Nu_{EG} \cdot k_{EG}}{d} \tag{25}$$

$$T_{Wall,t=t} = K_I \cdot \frac{\dot{Q}_{EG,Pipe} - \dot{Q}_{Pipe,Env}}{m \cdot Cp} \cdot dt + T_{Wall,t=t-1} \tag{26}$$

$$\dot{Q}_{Pipe,Env} = h_{Pipe,Env} \cdot A \cdot (T_{wall} - T_{Env}) \tag{27}$$

$$\dot{Q}_{EG,Pipe} = h_{EG,Pipe} \cdot A \cdot (T_{in} - T_{wall}) \tag{28}$$

Fig. 9

CONTROL OF AFTERTREATMENT OF AN INTERNAL COMBUSTION ENGINE

CROSS-REFERENCE TO RELATED APPLICATIONS

This application is a 371 of International Application No. PCT/EP2017/056730, filed Mar. 21, 2017, which claims priority to GB Patent Application 1606583.1, filed Apr. 15, 2016, the contents of both of which are incorporated by reference herein in their entirety.

TECHNICAL FIELD

The present disclosure relates to control of aftertreatment of an internal combustion engine. In particular, but not exclusively it relates to control of aftertreatment of diesel engines in motor vehicles. Aspects of the invention relate to an apparatus, a system, a vehicle and a method.

BACKGROUND

Over the last two decades diesel after-treatment systems have become increasingly complex to meet automotive emission legislation targets. Systems have included several components, such as a diesel oxidation catalyst (DOC) for converting carbon monoxide and hydrocarbons to carbon dioxide, a diesel particulate filter (DPF) for filtering and burning soot, and a selective catalytic reduction (SCR) system for the treatment of nitrogen oxides (NOx). More recently, the DOC has been replaced on some systems with a lean NOx Trap (LNT) which performs substantially the same functions as the DOC but additionally provides low temperature storage and conversion of NOx.

A problem with existing systems is that the components are generally operated independently of each other. This has resulted in a large number of sensors being required for thermal and chemical management of the system. This has also meant that a large number of signals received from the sensors have had to be analyzed. Additionally the temperature sensors have a low response time and accuracy. Furthermore, from a diagnostics point of view, the sensors require complex monitoring functions and are an added cost to the system.

Additional problems include difficulty in ensuring an optimum fuel-urea consumption balance for NOx conversion between the LNT and the SCR.

It is an aim of the present invention to address the disadvantages of the prior art systems.

SUMMARY OF THE INVENTION

Aspects and embodiments of the invention provide an apparatus, a system, a vehicle and a method as claimed in the appended claims.

According to an aspect of the invention there is provided an apparatus for controlling an aftertreatment system of an internal combustion engine, the apparatus comprising a processing means configured to: receive a first signal from a first temperature sensing means indicative of a first temperature of exhaust gases outputted from an internal combustion engine at a first location upstream of a first exhaust system component configured to provide a passage for exhaust gases; receive a second signal from a flow rate sensing means indicative of a flow rate of the exhaust gases outputted from the internal combustion engine; calculate an approximated value at least from the first signal and the second signal, the approximated value being indicative of a second temperature of exhaust gases at a location downstream of the first exhaust system component; and provide an output signal to control the aftertreatment system, in dependence of the calculated approximated value.

This provides the advantage that the number of sensors used to monitor an internal combustion after-treatment system may be reduced. It also provides an improved response time to changes in second temperature of exhaust gases at a second location.

In an embodiment, the output signal is provided to fuel injection means to control a rate of fuel injection.

In some embodiments, the processing means comprises a processor, the first temperature sensing means comprises a first temperature sensor, the flow rate sensing means comprises a flow rate sensor and the fuel injection means comprises a diesel injector.

In some embodiments, the processing means is configured to calculate a rate of heat loss from the exhaust gases during the passage of the exhaust gases through the first exhaust system component.

This provides the advantage that a temperature of the exhaust gases exiting the first exhaust system component may be calculated in instances where heat loss from the exhaust gases is a major factor in determining their change in temperature.

The processing means may be configured to calculate a rate of heat loss from the exhaust gases to a substrate of the first exhaust system component during the passage of the exhaust gases through the first exhaust system component.

This provides the advantage that changes in temperature of the substrate may be determined, leading to accurate calculations for the approximated value indicative the second temperature of the exhaust gases.

The processing means may be configured to calculate a rate at which heat is conducted away from the substrate to surrounding material.

This provides the advantage that accurate values for the rate of heat loss from the exhaust gases to the substrate may be determined.

In some embodiments, the processing means is configured to calculate a rate of heat generated by chemical reactions during the passage of the exhaust gases through the first exhaust system component.

This provides the advantage that a temperature of the exhaust gases exiting the first exhaust system component may be calculated in instances where the first exhaust system component is configured to facilitate chemical reactions within the exhaust gases.

In some embodiments, the first exhaust system component comprises a substrate having a catalyst configured to facilitate chemical reactions of component gases of the exhaust gases.

The first exhaust system component may comprise a lean NOx trap (LNT) or a diesel oxidation catalyst (DOC).

In some embodiments, the processing means is configured to determine a drop in pressure in the exhaust gases between an inlet of the first exhaust system component and an outlet of the first exhaust system component.

This provides the advantage that a more accurate temperature of the exhaust gases exiting the first exhaust system component may be calculated in instances where a drop in pressure of the exhaust gases is a factor in determining their change in temperature In some embodiments, the processing means is configured to: calculate an intermediate value from the first signal and the second signal, the intermediate value being indicative of an intermediate temperature of exhaust gases at a location downstream of a second exhaust system component and upstream of the first exhaust system component; and calculate the approximated value indicative of second temperature from the intermediate value.

This provides the advantage that a more accurate temperature of the exhaust gases exiting the first exhaust system component may be calculated in instances where more than one exhaust system component exists between the location of the first sensing means and the location for which the approximated value is calculated.

The second exhaust system component may comprise a turbocharger.

In some embodiments, the processing means is configured to: receive a third signal indicative of a third temperature of exhaust gases downstream of a further exhaust system component, the further exhaust system component being arranged downstream of the first exhaust system component; and calculate a correction of the approximated value in dependence on the third signal.

This provides the advantage that an approximated value that may be determined with a fast response time to changes in temperatures, but which may not be as accurate as desired, may be periodically corrected resulting in accurate approximated values that also respond quickly to changes in temperatures of the exhaust gases.

The correction of the approximated value may be determined by calculating a rate of loss of heat from the exhaust gases during passage of the exhaust gases through the further exhaust system component.

The further exhaust system component may comprise a diesel particulate filter.

In some embodiments the processing means comprises an electronic processor having an electrical input for receiving said first and second signals and an electronic memory device electrically coupled to the electronic processor and having instructions stored therein, wherein the processor is configured to access the memory device and execute the instructions stored therein such that it is operable to receive the first and second signals, calculate the approximated value indicative of the second temperature and control the at least one fuel injector in dependence of the approximated value.

According to another aspect of the invention there is provided a system for treatment of exhaust gases from a diesel engine, the system comprising an apparatus as described above and a plurality of exhaust system components configured to provide a passage for the exhaust gases, wherein the plurality of exhaust system components includes the first exhaust system component.

This provides the advantage that the number of sensors that are required to monitor a diesel after-treatment system may be reduced. It also provides an improved response time to changes in a second temperature of exhaust gases at a second location.

According to another aspect of the invention there is provided a vehicle comprising a diesel engine and a system as described above.

According to a further aspect of the invention there is provided a method for controlling exhaust gas aftertreatment for an internal combustion engine, the method comprising: receiving a first signal from a first temperature sensor indicative of a first temperature of exhaust gases outputted from an internal combustion engine at a first location upstream of a first exhaust system component configured to provide a passage for exhaust gases;

receiving a second signal from a flow rate sensor indicative of a flow rate of the exhaust gases outputted from an internal combustion engine; calculating an approximated value at least from the first signal and the second signal, the approximated value being indicative of a second temperature of exhaust gases downstream of the first exhaust system component;

and providing an output signal to control exhaust gas aftertreatment in dependence of the calculated approximated value.

This provides the advantage that the number of sensors that are required to monitor an internal combustion aftertreatment system may be reduced. It also provides an improved response time to changes in temperature of exhaust gases at the location of the second temperature.

In an embodiment the output signal is provided to fuel injection means to control a rate of fuel injection.

In some embodiments the calculating comprises calculating a rate of heat loss from the exhaust gases during the passage of the exhaust gases through the first exhaust system component.

This provides the advantage that an accurate temperature of the exhaust gases exiting the first exhaust system component may be calculated in instances where heat loss from the exhaust gases is a major factor in determining their change in temperature.

In some embodiments the calculating comprises calculating a rate of heat loss from the exhaust gases to a substrate of the first exhaust system component during the passage of the exhaust gases through the first exhaust system component.

This provides the advantage that changes in temperature of the substrate may be determined, leading to accurate calculations for the approximated value indicative the second temperature of the exhaust gases.

The calculating may comprise calculating a rate at which heat is conducted away from the substrate to surrounding material.

This provides the advantage that accurate values for the rate of heat loss from the exhaust gases to the substrate may be determined.

In an embodiment, the processing means is configured to calculate a temperature of the substrate and the rate of heat loss from the exhaust gases to the substrate is dependent upon the difference between the temperature of the exhaust gases and the temperature of the substrate.

In an embodiment, the processing means is configured to calculate the rate of heat loss from the exhaust gases to the substrate in dependence upon a stored value for the heat transfer coefficient.

In some embodiments the processing means is configured to receive a stored value of a concentration for each one of a plurality of exhaust gas species and the calculating comprises calculating a rate of heat generated by chemical reactions of the exhaust gas species during the passage of the exhaust gases through the first exhaust system component.

This provides the advantage that a temperature of the exhaust gases exiting the first exhaust system component may be calculated in instances where the first exhaust system component is configured to facilitate chemical reactions within the exhaust gases.

In some embodiments the calculating comprises calculating a drop in pressure in the exhaust gases between the pressure of gases at an inlet of the first exhaust system component and an outlet of the first exhaust system component.

This provides the advantage that a more accurate temperature of the exhaust gases exiting the first exhaust system component may be calculated in instances where a drop in pressure of the exhaust gases is a factor in determining their change in temperature.

In some embodiments the calculating comprises: calculating an intermediate value from the first signal and the second signal, the intermediate value being indicative of an intermediate temperature of exhaust gases at a location downstream of a second exhaust system component and upstream of the first exhaust system component; and calculating the approximated value indicative of second temperature from the intermediate temperature.

This provides the advantage that a more accurate temperature of the exhaust gases exiting the first exhaust system component may be calculated in instances where more than one exhaust system component exists between the location of the first sensing means and the location for which the approximated value is calculated.

In some embodiments the method comprises receiving a third signal indicative of a third temperature of exhaust gases downstream of a further exhaust system component, the third exhaust system component being arranged downstream of the first exhaust system component, and calculating a correction of the approximated value in dependence on the third signal.

This provides the advantage that an approximated value, that may be determined with a fast response time to changes in temperatures but which may not be as accurate as desired, may be periodically corrected resulting in accurate approximated values that also respond quickly to changes in temperatures of the exhaust gases.

The calculating a correction may comprise calculating a rate of loss of heat from the exhaust gases during passage of the exhaust gases through the further exhaust system component.

According to a further aspect of the invention there is provided an apparatus for controlling injection in an internal combustion engine, the apparatus comprising an electronic processor and an electronic memory device electrically coupled to the electronic processor and having instructions electronically stored therein, wherein the processor is configured to access the memory device and execute the instructions stored therein such that it is operable to: receive a first signal from a first temperature sensor indicative of a first temperature of exhaust gases outputted from an internal combustion engine at a first location upstream of a first exhaust system component configured to provide a passage for exhaust gases; receive a second signal from a flow rate sensor indicative of a flow rate of the exhaust gases outputted from an internal combustion engine; calculate an approximated value at least from the first signal and the second signal, the approximated value being indicative of a second temperature of exhaust gases downstream of the first exhaust system component; and provide an output signal for controlling at least one fuel injector in dependence of the calculated approximated value.

This provides the advantage that the number of sensors used to monitor an internal combustion after-treatment system may be reduced. It may also provide an improved response time to changes in temperature of exhaust gases.

According to a still further aspect of the invention there is provided an apparatus for controlling injection in an internal combustion engine, the apparatus comprising a processing means configured to: receive a first signal from a first temperature sensing means indicative of a first temperature of exhaust gases outputted from an internal combustion engine at a first location upstream of a first exhaust system component configured to provide a passage for exhaust gases; receive a second signal from a flow rate sensing means indicative of a flow rate of the exhaust gases outputted from an internal combustion engine; determining an approximated value at least from the first signal and the second signal, the approximated value being indicative of a characteristic of exhaust gases at a location downstream of the first exhaust system component; and providing an output signal to control a rate of fuel injection in dependence of the approximated value.

This provides the advantage that the number of sensors used to monitor an internal combustion after-treatment system may be reduced. In particular a sensor is not required to sense the characteristic of exhaust gases at the location downstream of the first exhaust system component.

In some embodiments, the characteristic comprises a measure of a mass flow rate of a component gas of the exhaust gases. The component gas may be one or more nitrogen oxides.

This provides the advantage that a sensor suitable for the sensing of the component gas may be eliminated. In addition, response times to changes in the amount of the component gas present in the exhaust gases following the first exhaust system component may be improved. For example, where the first exhaust system component is configured to facilitate chemical reactions in the exhaust gases, changes in the amount of component gas present after passage through the first exhaust system component may be determined more rapidly when compared to a system that detects the component gas at the exit of the first exhaust system component.

In some embodiments, the characteristic comprises a temperature of exhaust gases.

This provides the advantage that the number of temperature sensors used to monitor an internal combustion after-treatment system may be reduced. It may also provide an improved response time to changes in temperature of exhaust gases.

According to a still further aspect of the invention there is provided an apparatus for treatment of exhaust gases received from an internal combustion engine, the apparatus comprising: a first component configured to remove a first constituent of the exhaust gases; a second component configured to remove a second constituent of the exhaust gases; a first temperature sensing means configured to provide an output signal indicative of a sensed temperature of exhaust gases, the first temperature sensing means being located at a first position upstream of the first component; and a second temperature sensing means configured to provide an output signal indicative of a sensed temperature of exhaust gases, the second temperature sensing means being located at a second position downstream of the second component, wherein the apparatus does not include a temperature sensing means located between the first component and the second component.

This provides the advantage that the number of temperature sensing means is reduced when compared to existing systems. Consequently, difficulties experienced in packaging the temperature sensing means are reduced. Also the number of temperature sensor signals that must be analyzed is reduced.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 4 shows equations that may be used by the processing means 102 of FIG. 1 or 2 to model the gas phase within a catalytic exhaust system component;

FIG. 5 shows equations that may be used by the processing means 102 to model the solid phase within a wall-flow or through-flow catalytic exhaust system component;

FIG. 6 shows equations that may be used by the processing means 102 to model the chemical reactions taking place in an exhaust system component;

FIG. 7 shows equations that may be used by the processing means 102 to model pressure drops across an exhaust system component;

FIG. 8 shows an equation (21) that may be used by the processing means 102 to determine a rate of change of the temperature $$\left(\frac{\partial T_{IN}}{\partial t}\right)$$

Figure 10:
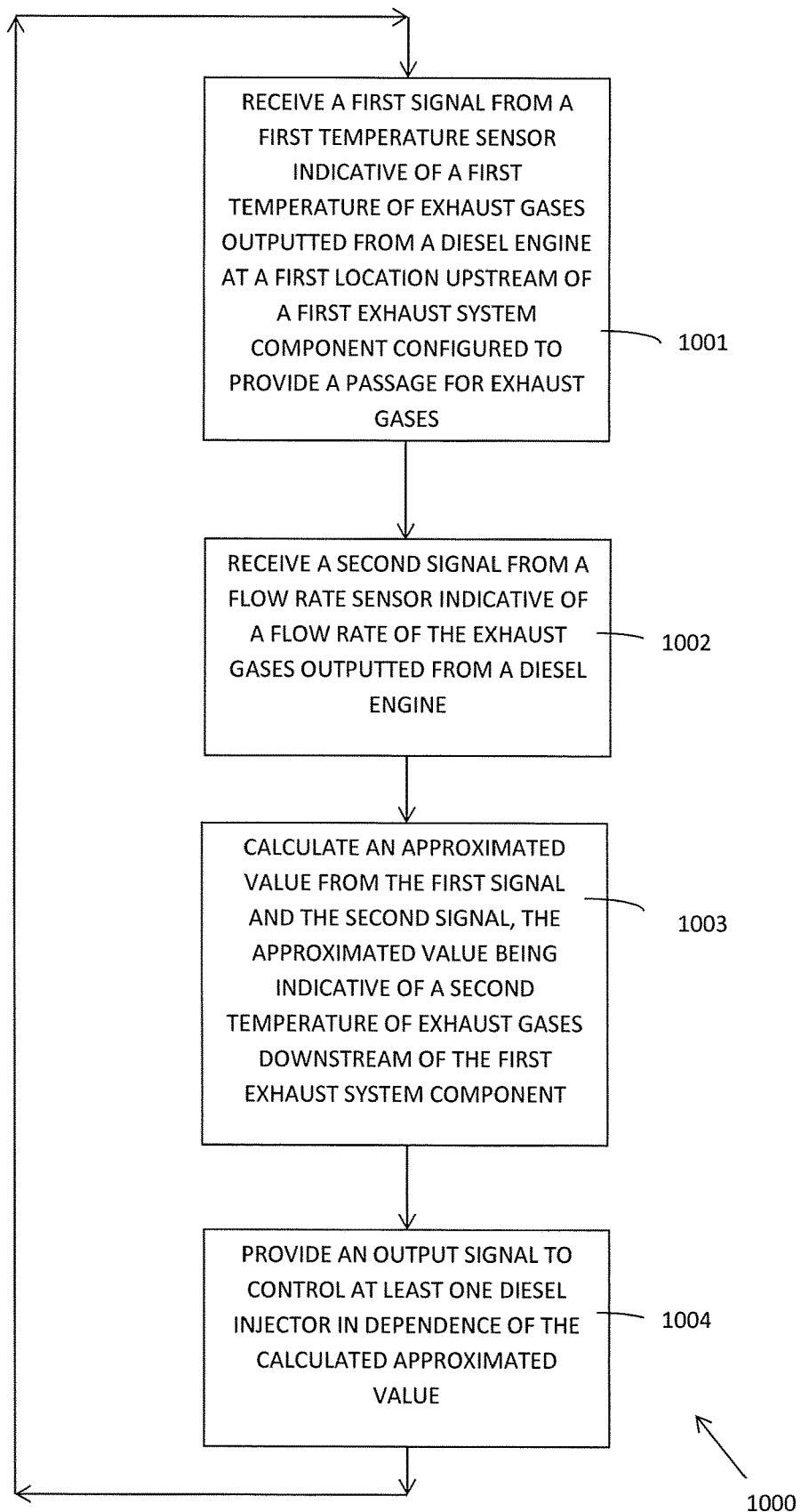
Figure 11:
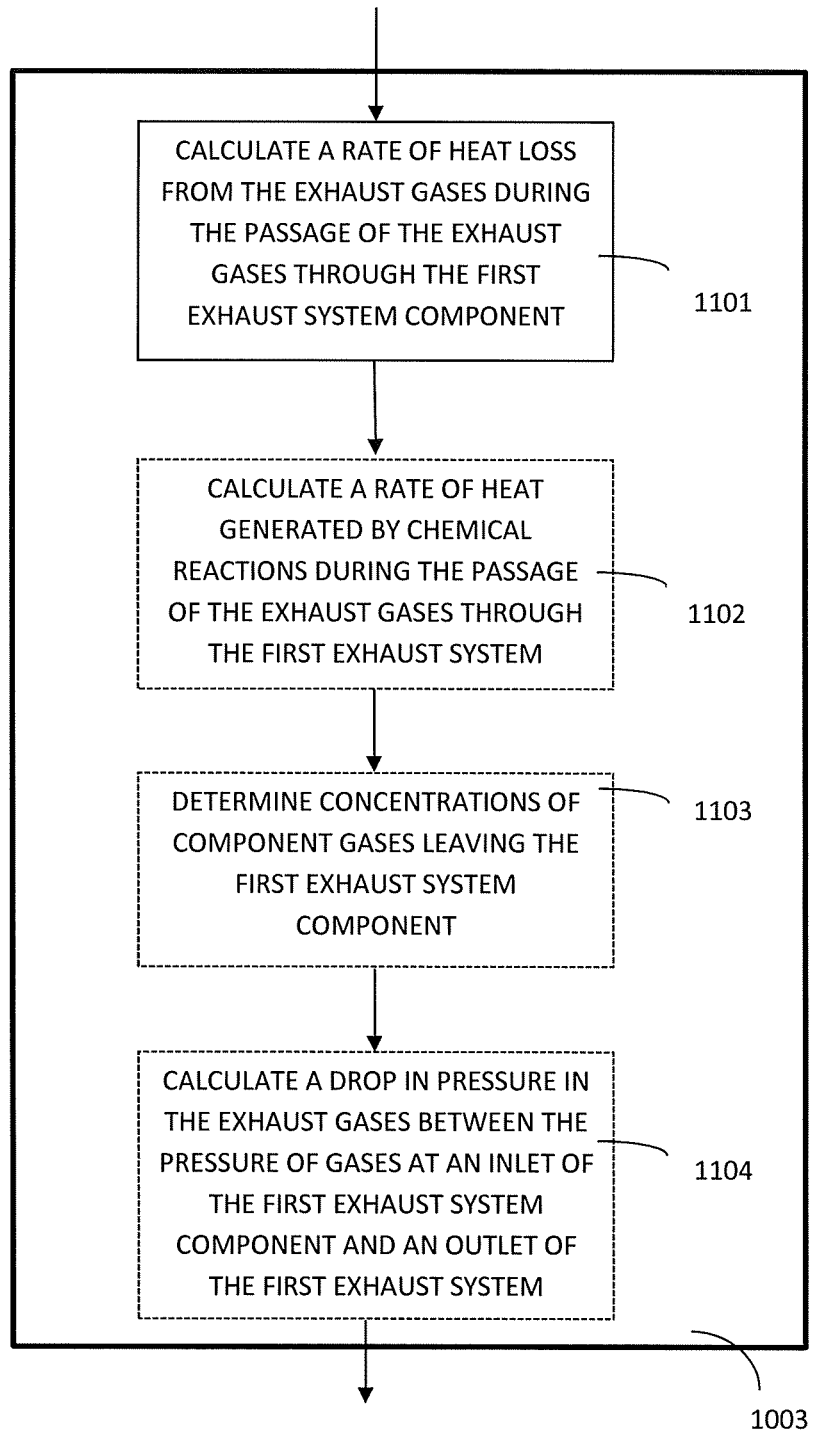
Figure 12:
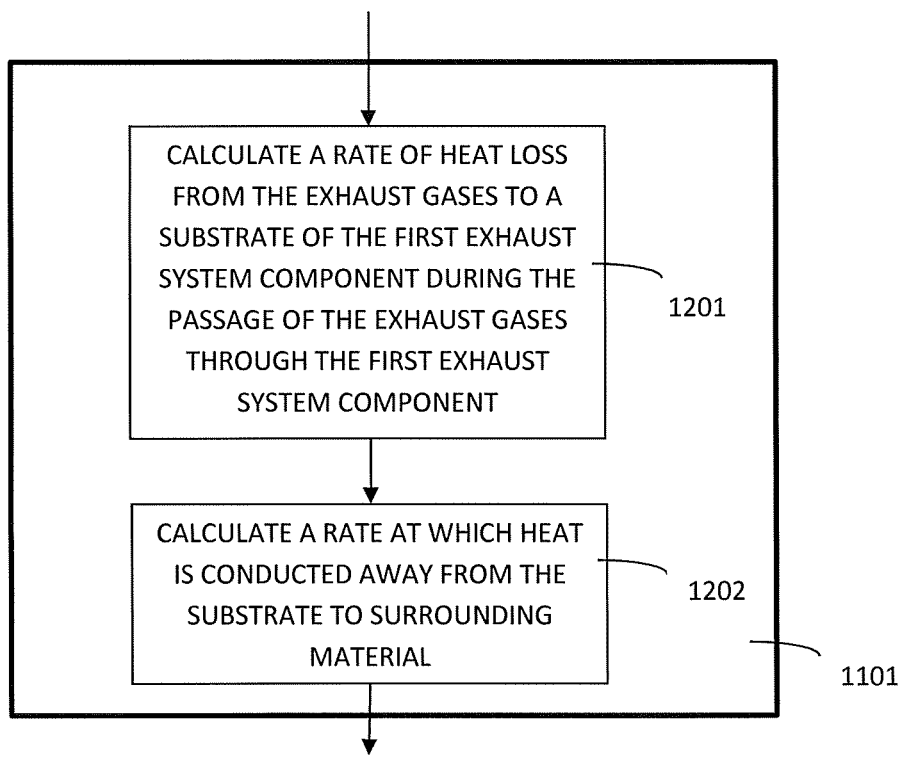
Figure 13:
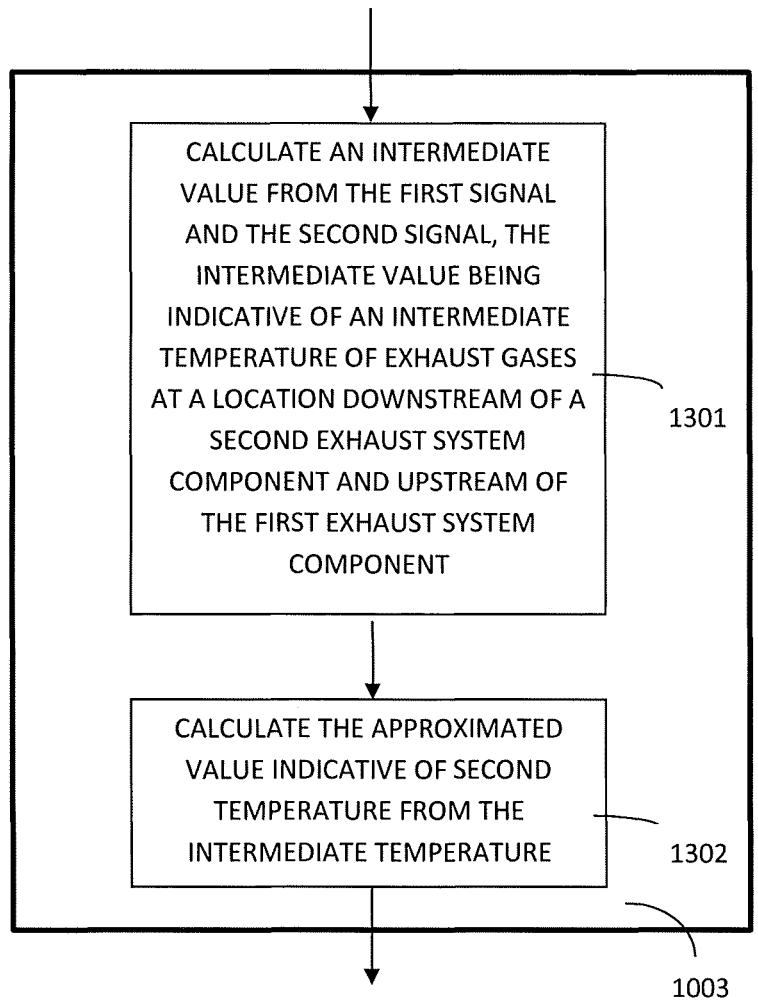
Figure 14:
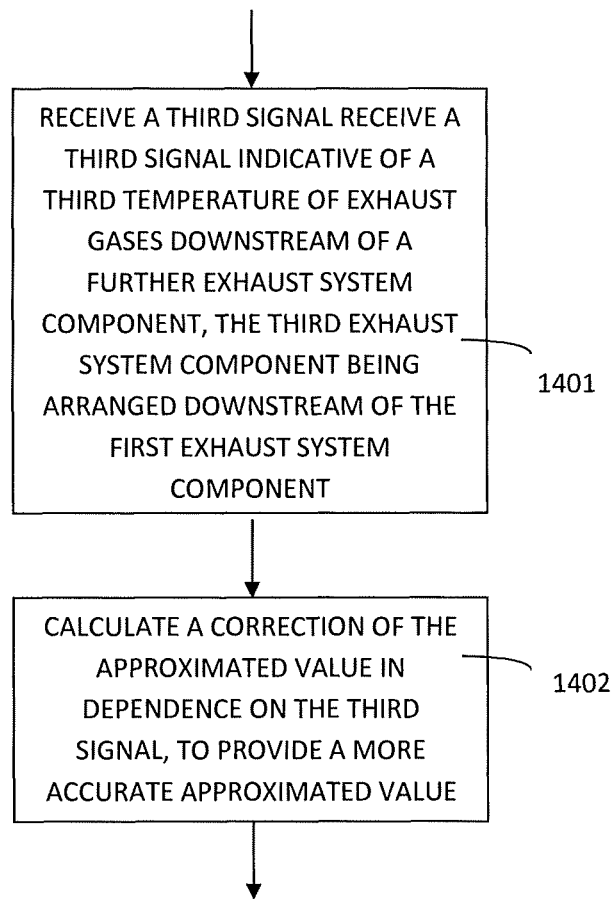

at the inlet of the DPF;

FIG. 9 shows equations that may be used by the processing means 102 to model effects of a turbocharger on the exhaust gases;

FIG. 10 shows a flow chart of a method 1000 for controlling injection in a diesel engine;

FIG. 11 shows a flow chart of an example of processes that may be performed within the block 1003 of FIG. 10;

FIG. 12 shows a flow chart of processes that may be performed in block 1101 of FIG. 11;

FIG. 13 shows a flow chart of processes that may be performed when two or more exhaust system components exist between a location of a measured temperature and a location for which the approximated value of temperature is calculated; and FIG. 14 shows a flow chart of processes that may be performed to improve the accuracy of the approximated value for the second temperature.

DETAILED DESCRIPTION

The Figures illustrate an apparatus 100 for controlling injection in an internal combustion engine 101, the apparatus 100 comprising a processing means 102 configured to: receive a first signal from a first temperature sensing means 103 indicative of a first temperature of exhaust gases outputted from an internal combustion engine 101 at a first location upstream of a first exhaust system component 104 configured to provide a passage for exhaust gases; receive a second signal from a flow rate sensing means 105 indicative of a flow rate of the exhaust gases outputted from an internal combustion engine; calculate an approximated value at least from the first signal and the second signal, the approximated value being indicative of a second temperature of exhaust gases at a location downstream of the first exhaust system component; and provide an output signal to control a rate of fuel injection, in dependence of the calculated approximated value.

The approximated value may be an approximation of the actual temperature of exhaust gases at the location downstream of the first exhaust system component.

Figure 1:
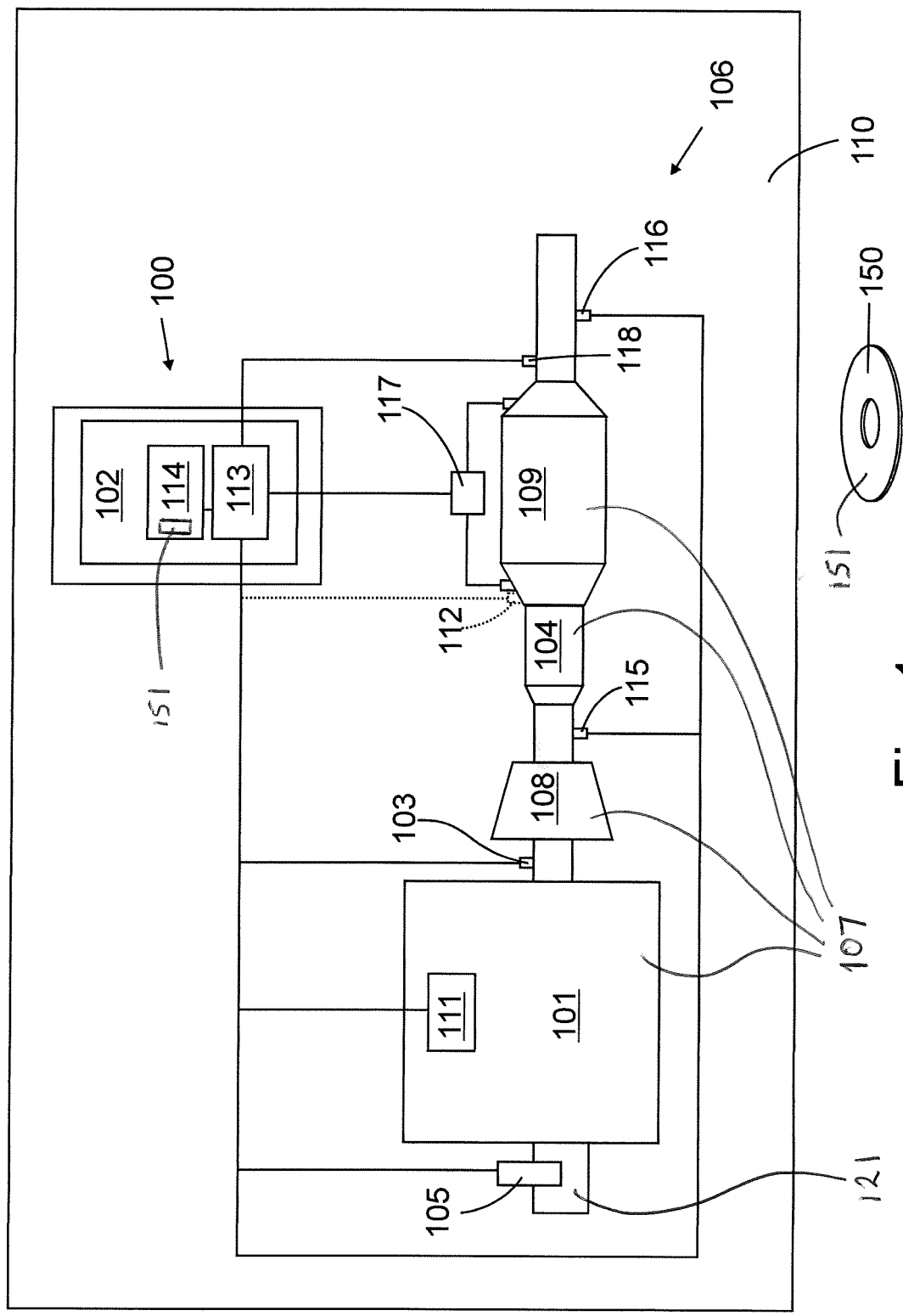
FIG. 1 shows a block diagram of a vehicle 110 comprising a system 106 that includes an example apparatus 100.

An example of an apparatus 100 is shown in the block diagram of FIG. 1. As shown in FIG. 1, the apparatus 100 may form a part of a system 106 for treatment of exhaust gases from a diesel engine 101. The system comprises the apparatus 100 and a plurality of exhaust system components configured to provide a passage for the exhaust gases, wherein the plurality of exhaust system components 107 includes the first exhaust system component 104. The system 106 shown in FIG. 1 includes the first exhaust system component 104 and second exhaust system component 108 and a further exhaust system component 109. However, it will be appreciated that other systems embodying the present invention may comprise more or less than three exhaust system components. (A system comprising four exhaust system components will be described in detail below with regard to FIG. 2.)

The exhaust system 106 is arranged to receive exhaust gases from the diesel engine 101, and both the diesel engine 101 and the system 106 are part of a vehicle 110.

In an alternative arrangement the exhaust system 106 may be arranged to receive exhaust gases from a petrol engine rather than the diesel engine 101.

The apparatus 100 may be an engine control unit or powertrain control module configured to control diesel injectors 111 within the engine 101.

In the present embodiment, the second exhaust system component 108 comprises a turbocharger 108.

The apparatus 100 comprises a processing means 102 configured to receive a first signal from a first temperature sensing means 103 indicative of a first temperature of exhaust gases outputted from the diesel engine 101 at a first location upstream of the first exhaust system component 104 that is configured to provide a passage for exhaust gases. (In the present embodiment the first temperature sensing means 103 is also upstream of the second exhaust system component 108.) The processing means 102 is also configured to receive a second signal from a flow rate sensing means 105 indicative of a flow rate of the exhaust gases outputted from the diesel engine 101 and to calculate an approximated value from the first signal and the second signal. The approximated value is indicative of a second temperature of exhaust gases at a location 112 downstream of the first exhaust system component 104. The processing means is also configured to provide an output signal to control a rate of diesel injection by the diesel injectors 111, in dependence of the calculated approximated value.

It may be noted that the flow rate sensing means 105 is on the input side of the engine, but, the mass flow rate from the engine may be calculated based on the mass flow rate into the engine and the mass of fuel injected into the engine. Thus, the second signal provided by the flow rate sensing means 105 provides a signal indicative of a flow rate of the exhaust gases outputted from the diesel engine 101.

The processing means may comprise an electronic processor 113 having an electrical input for receiving the first signal from a first temperature sensing means 103 and for receiving the second signal from a flow rate sensing means 105. The processing means may further comprise an electronic memory device 114 electrically coupled to the electronic processor 113 and having instructions electronically stored therein, wherein the processor 113 is configured to access the memory device 114 and execute the instructions stored therein such that it is operable to receive the first and second signals, calculate the approximated value indicative of the second temperature and control the diesel injectors 111 in dependence of the approximated value. The instructions stored on the memory device 114 may constitute a computer program 151, and the computer program 151 may be provided to the processing means for storage on the memory device 114.

The electronic memory device 114 may also store map based models that are specific to the engine 101, which provide an indication of the concentrations of exhaust gas species, including hydrocarbon and carbon monoxide concentrations, that are generated by the engine at various engine settings, as is known in the art. The electronic memory device 114 may similarly electronically store values of NOx and soot particle concentrations that are generated by the engine. These stored map based models comprise values that may have been derived from previously performed testbed work or obtained via numerical models.

The first temperature sensing means 103 comprises a first temperature sensor. In an embodiment the first temperature sensor comprises a thermistor, but alternatively it may comprise a thermocouple. The flow rate sensing means may comprise a flow rate sensor, such as a mass air flow sensor, located on an air inlet duct 121 of the engine 101.

During operation, the engine 101 creates several pollutants including various unburned hydrocarbons (HC) such as $C_3H_6$, $C_7H_8$, $C_{10}H_{22}$, carbon monoxide (CO), unburned carbon particle matter (soot) and mono-nitrogen oxides, in particular nitric oxide (NO) and nitrogen dioxide (NO2), referred to generally as NOx. The exhaust system 106 comprises at least the first exhaust system component 104 for reducing harmful exhaust gas species produced in the combustion chamber of the diesel engine 101 to harmless levels.

The first exhaust system component 104 may comprise a substrate having a catalyst configured to facilitate chemical reactions with component gases of the exhaust gases. For example, in the present embodiment the first exhaust system component 104 comprises a lean NOx trap (LNT) but in an alternative it may comprise a diesel oxidation catalyst (DOC).

In the present embodiment, the system also comprises the further exhaust system component 109 which comprises a diesel particulate filter (DPF). The DPF 109 is a wall flow filter that is configured to filter soot particles that are output from the engine within the exhaust gases. In some examples, catalyst may be provided on internal walls of the wall flow filter. A differential pressure sensor 117 is also provided, which provides an output signal to the processor 113 indicative of a pressure drop in exhaust gases across the DPF. That is, the differential pressure sensor 117 provides a measure of the difference between the pressure of exhaust gases at the outlet and the inlet of the DPF.

The system 106 also comprises a first oxygen sensing means 115 in the form of a UHEGO (Universal Heated Exhaust Gas Oxygen) sensor, which is configured to provide values to the processor 113 of oxygen concentrations detected within the exhaust gases. In the present embodiment the UHEGO sensor is positioned downstream of the second exhaust system component 108 and immediately upstream of the first exhaust system component 104. In the present embodiment, the system also comprises a second oxygen sensing means 116, which is configured to provide values to the processor 113 of oxygen concentrations detected within the exhaust gases downstream of the DPF 109. The second oxygen sensing means 116 may comprise a UHEGO sensor or another sensor capable of providing an indication of oxygen concentrations. In an alternative embodiment, the second oxygen sensing means 116 is located upstream of the DPF 109.

During operation, the engine 101 emits exhaust gases into the exhaust system 106, where temperatures of the exhaust gases are measured by sensor 103 before they pass through the turbocharger 108. The concentrations of oxygen in the exhaust gases is then measured by the first UHEGO sensor 115 before the gases enter the first exhaust component 104.

In the present embodiment, the first exhaust component is an LNT (Lean NOx Trap) and has a substrate configured to store and convert NOx to nitrogen and water vapour. During operation when the substrate temperature is between 150 and 250 degrees Celsius the adsorption reaches high efficiency. Desorption and reduction of the NOx to nitrogen and water vapour is achieved when the temperature of the LNT substrate is between 250 and 350 degrees Celsius in the presence of hydrocarbons. This is achieved during a regeneration of the LNT by switching the operation mode of the diesel engine from "lean" to "rich" (essentially modifying the air-fuel ratio). The control of the regeneration of the LNT is achieved by precise measurements of the oxygen content of the exhaust gas as measured by the first and second UHEGO sensors 115 and 116. That is, the diesel injection necessary to cause the regeneration is performed by the diesel injectors 111 under the control of the processor 113 in dependence of the signals received from the UHEGO sensors 115 and 116.

In the present embodiment, after passing through the LNT 104, the exhaust gases pass through the DPF 109. During operation, the DPF accumulates carbon particles (or soot), which tends to cause an increase of pressure in the exhaust gases across the DPF. Consequently, at controllable intervals, the collected particulate matter is oxidised by raising the temperature of the DPF to elevated temperatures (typically in excess of 600° C.). In order to recognise that an oxidation (or regeneration) event is required, the particulate matter loading on the DPF is monitored by a process in the processing means 102 that takes inputs from the rate of gas flow through the DPF, the pressure drop across the DPF (via pressure sensor 117) and the temperature of the DPF substrate.

In order to achieve the elevated temperature required for regeneration of the DPF, the processor 113 is configured to control fuel injection events based on DPF substrate temperatures. As will be described in further detail below, the DPF substrate temperature is calculated from signals received from the temperature sensor 103, the rate of flow of gases as measured by the flow rate sensing means 105 and a mathematical model that models temperature changes of the exhaust gases as they pass through exhaust component(s) between the sensor 103 and the DPF 109. In the present example, where more than one exhaust component exists between the temperature sensor 103 and the DPF 109, an intermediate temperature may be calculated that provides an approximation of the temperature of gases at the outlet of the turbocharger 108 and the inlet of the LNT 104. The temperature of gases at the inlet of the DPF may then be calculated using this intermediate temperature.

This method of calculating approximated values of temperatures of the gas as it flows through the exhaust system provides very fast indications of changes in temperatures and also enables fewer temperature sensors to be used in the system 106. For example, existing systems are known to include temperature sensors at the outlet of the turbocharger and the outlet of the LNT, but there are no temperature sensors at these locations in the present system.

However, to ensure accuracy of the calculated temperatures, the system 106 may include a second temperature sensing means 118, located at the outlet of the DPF 109, that is configured to provide a third signal indicative of a third temperature of exhaust gases downstream of the DPF 109 to the processor 113. In which case, the processor 113 may be configured to calculate a correction of the approximated value of temperatures of gases entering the DPF 109 in dependence on the third signal. The corrected temperature may be determined by calculating a rate of loss of heat from the exhaust gases during passage of the exhaust gases through the DPF 109. The correction provides a more accurate approximation to the actual temperature of gases entering the DPF, but is slower to respond to changing temperatures. Consequently, the correction may just be made periodically and less frequently than the calculation of temperatures based on the temperature signals received from sensor 103.

Figure 2:
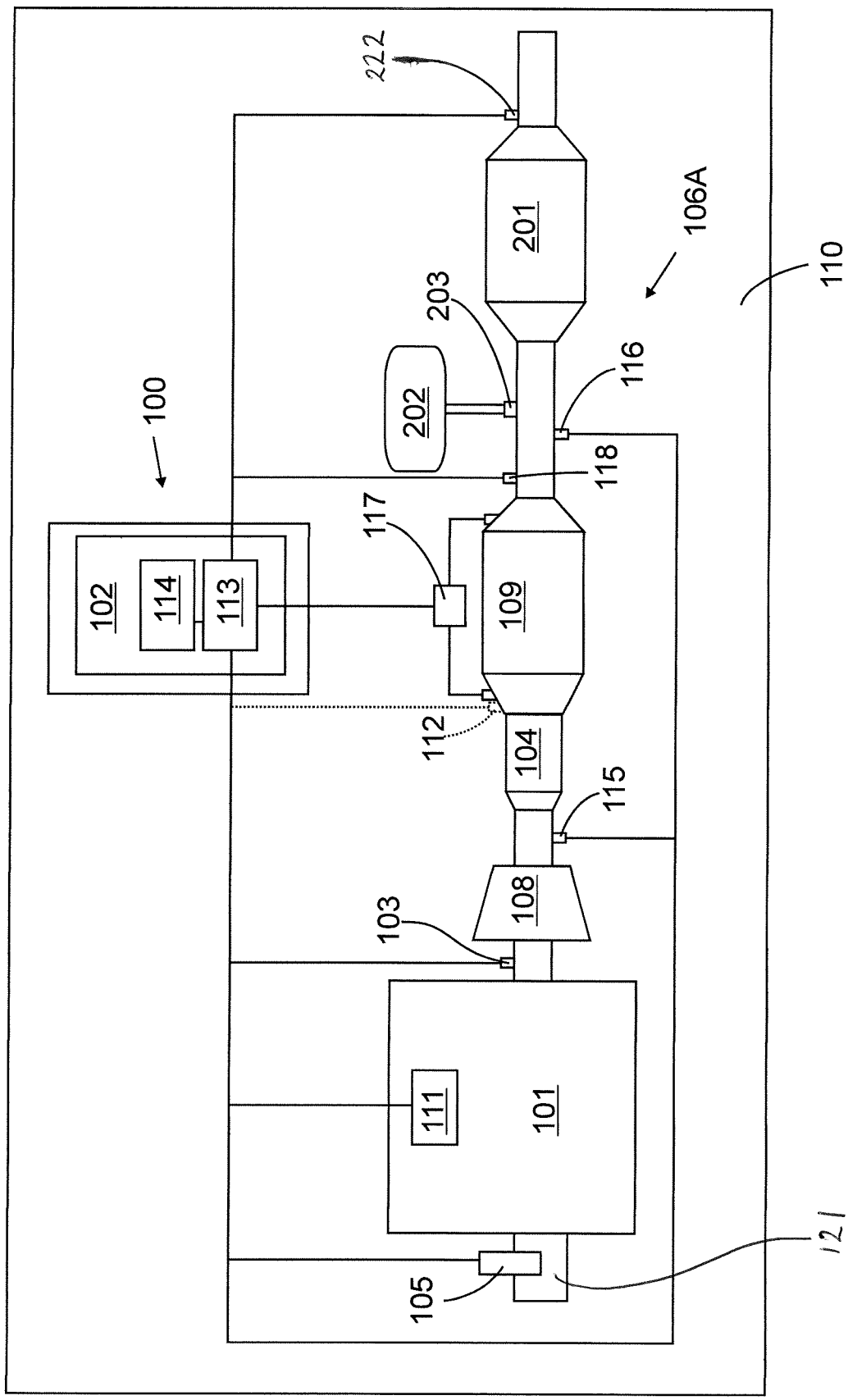
FIG. 2 shows a block diagram of a vehicle 110 comprising a second system 106A that includes an example apparatus 100.

An alternative system 106A embodying the present invention is shown in FIG. 2 within a vehicle 110. The system 106A has many features in common with those of the system 106 of FIG. 1 and they have been identified with the same reference signs. Thus, for example, the exhaust system 106A receives exhaust gases from a diesel engine 101. The temperature of the exhaust gases leaving the engine is measured by a temperature sensor 103 which provides a signal to the processing means 102. The processing means 102 also receives a second signal indicative of a rate of flow of exhaust gases from a flow rate sensing means 105.

The exhaust gases leaving the engine pass through a turbocharger 108, an LNT 104 (or alternatively a Diesel Oxidation Catalyst (DOC)) and a DPF 109 in a similar manner to the system of FIG. 1. However, the system 106A of FIG. 2 further comprises a selective catalytic reduction (SCR) module 201, which is positioned downstream from the DPF 109. The system 106A also includes a urea supply 202, from which urea is injected into exhaust gases by an injector 203 downstream of the DPF but upstream of the SCR module 201.

During use, the injected urea undergoes hydrolysis in the pipe upstream of the SCR module and the resulting ammonia is stored on the catalytic sites of the SCR module, enabling conversion of NOx within the SCR module to nitrogen and water, as is known.

To ensure that the SCR module 201 operates correctly, the rate of injection of urea is made dependent upon the temperature of the gases entering the SCR module and the rate of mass of NOx flowing into the SCR module. In previously known systems, NOx sensors may be used to determine NOx flowing into the SCR module. However, in the present embodiment, the processing means 102 is configured to calculate the varying concentrations of NOx as the exhaust gases flow through the various components of the system 106A and in particular the concentrations of NOx as the exhaust gases enter the SCR module.

The calculations performed by the processing means 102 make use of the above-described mathematical model that is used to calculate temperatures of the exhaust gases as they pass through the exhaust system components. The model and calculations use as input values the concentrations of the pollutant gases generated by the engine 101 that are stored in the memory device 114 (including stored NOx concentration values), oxygen concentrations sensed by UHEGO sensors 115 and 118, calculated temperatures of the exhaust gases and exhaust system components and values received from a NOx sensor 222. In particular, changes in NOx concentration caused by conversion by the LNT 104 may be calculated in order to determine the concentration of NOx arriving at the SCR module.

For both the embodiment of FIG. 1 and that of FIG. 2, the mathematical model employs thermodynamics and chemical kinetics to determine the temperatures of the gas and solid components of the systems, as well as compute the reaction rates and molar/mass balance of the exhaust gas species. This leads to a reduction in calibration time as the model inputs related to the system definition serve as the "calibration". The model is composed of submodules that can be applied to either flow-through catalysts (Diesel Oxidation Catalysts, Selective Catalytic Reduction Catalysts, Lean NOx Traps) or wall-flow particulate filters (Diesel Particulate Filter). Each submodule may be composed of a gas phase model, solid phase model, and chemical kinetics model. In addition, a submodule may comprise a pressure drop model.

The submodules for flow-through catalysts model the thermodynamics and chemical kinetics associated with the capture and release of NOx, conversion of hydrocarbons (HC) and carbon monoxide CO and heat exchange on the surface of the catalyst. The model is composed of a thermal model, which in turn consists of a solid phase, gas phase and pressure drop submodules, and a chemical model, that aims to describe the storage and release of NOx, HC, CO, $O_2$ and $NH_3$. A subsequent advantage is the ability to determine the chemical balance of the species. The model is adaptable and can be used for DOC, LNT or SCR systems.

Similarly, the submodules for wall-flow filters model the thermodynamics and chemical kinetics associated with the capture, release and conversion of soot, and heat exchange on the surface of the filter. Some DPFs might have a catalyst washcoat to aid in the conversion of hydrocarbons and carbon monoxide. As a consequence of this, the submodule for the catalysed DPF may contain an extra set of equations in the chemical kinetics model that are similar to the ones found for a catalytic component such as a DOC. The model is composed of a thermal model, which in turn consists of a solid phase, gas phase and pressure drop submodules, and a chemical model, that aims to describe the heat release by the conversion of the species (soot) as well as solving the chemical balance (mass/molar) of the species. The thermal model is similar to the wall-flow catalyst model, but the submodule for the DPF may differ from other modules by including modelling of the storage and filtration of soot, as well as an extra pressure loss term that represents the pressure drop experienced due to the flow of the gas through the porous wall, and its dependence on the soot loading of the filter.

The mathematical model also includes a submodule for modelling the turbocharger 108. This submodule may take the temperature measured by the temperature sensor 103 and the flow rate as measured by the flow rate sensing means 105 as inputs and calculates heat loss and pressure drop across the turbocharger in order to determine the temperature of the exhaust gases as they leave the turbocharger.

Figure 3:
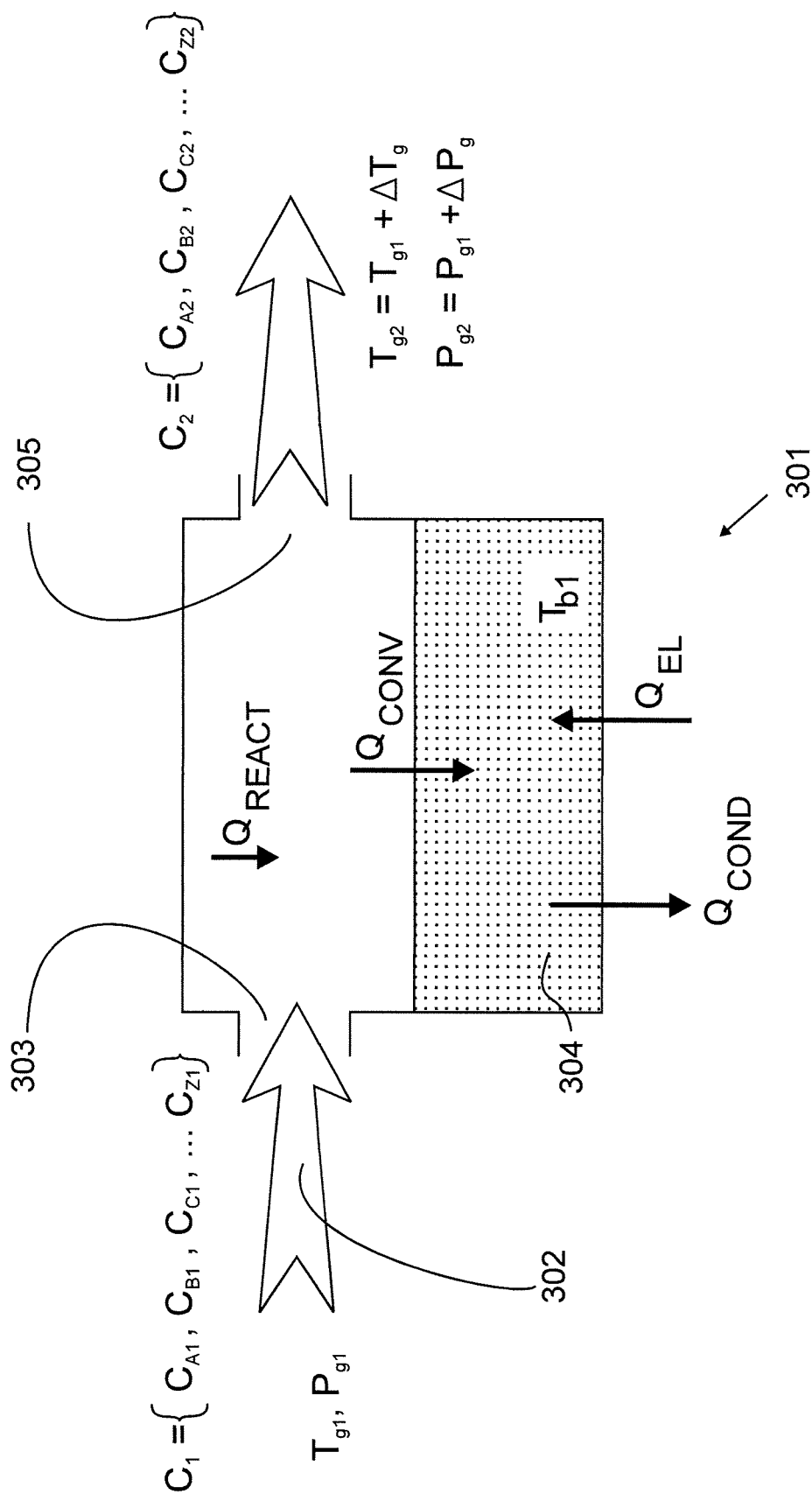
FIG. 3 shows a schematic diagram illustrating how a submodule of a mathematical model models a single exhaust system component 301.

A schematic diagram indicating generally how the sub-modules of the mathematical model provided by the apparatus 100 operate is shown in FIG. 3. The schematic diagram of FIG. 3 shows a submodule of the mathematical model models a single exhaust system component 301, such as the first, second, third or fourth exhaust system components 104, 108, 109 and 201. However, as explained in detail below, for the turbocharger 108, temperature drop and pressure drop calculations are done via a different set of equations to the ones used for the catalysts 104, 109 and 201.

A flow of exhaust gases (indicated by arrow 302) enters an inlet 303 of the component 301 with a temperature $T_{g1}$, a pressure $P_{g1}$ and a set $C_1$ of constituent exhaust gas concentrations. For example, the set $C_1$ may include a first value $C_{A1}$ indicating the concentration of NOx, a second value $C_{B1}$ indicating the concentration of carbon monoxide, a third value $C_{C1}$ indicating the concentration of a first known hydrocarbon emitted from the engine, a fourth value $C_{C2}$ indicating the concentration of a second known hydrocarbon, and so on. The temperature $T_{g1}$, the pressure $P_{g1}$ and the set $C_1$ of constituent gas concentrations may have been determined from calculations made in respect of a previous submodule that models a previous exhaust system component in the system. For example, where the component 301 is the LNT 104, the temperature $T_{g1}$, the pressure $P_{g1}$ and the set $C_1$ may be values determined in previous calculations in respect of the turbocharger 108, or where the component 301 is the DFP 109, the temperature $T_{g1}$, the pressure $P_{g1}$ and the set $C_1$ may be values determined in previous calculations in respect of the LNT 104. Alternatively, as is the case for the turbocharger 108, the temperature $T_{g1}$, may be a measured value and the set $C_1$ may be values previously stored in the memory device 114. The pressure at the inlet of the turbocharger may be obtained from a pressure sensor positioned alongside the temperature sensor 103. In an alternative embodiment, a backwards calculation of pressures may be performed in which the pressure values upstream of each component are determined from the pressure values downstream of each component as a function of flow rate and local temperature and on the basis that the pressure at the output end of the system 106 or 106A is at atmospheric pressure.

The submodules of the model calculate change in temperature of the exhaust gases, and depending upon the exhaust system component being modelled, the change in pressure and changes in constituent gas concentrations as the exhaust gases pass through the exhaust system component 301 in order to determine the temperature $T_{g2}$, the pressure $P_{g2}$ and the set $C_2$ of constituent gas concentrations at the outlet 305 of the exhaust system component 301. These new values for temperature $T_{g2}$, the pressure $P_{g2}$ and the set $C_2$ of constituent gas concentrations may then be used as the input values for the next submodule corresponding to the next downstream exhaust system component in the system. For example, where temperature $T_{g2}$, the pressure $P_{g2}$ and the set $C_2$ of constituent gas concentrations are found for the first exhaust system component 104 they are then used as the input values for the temperature $T_{g1}$, the pressure $P_{g1}$ and the set $C_1$ of constituent gas concentrations for the next exhaust system component 109.

The mathematical model calculates the heat, $Q_{CONV}$, that is passed to the substrate 304 of the exhaust system component 301 from the exhaust gases by convection and calculates heat, $Q_{COND}$, that is conducted away from the substrate to surrounding material. For some components (such as for a DOC, LNT, SCR or DPF) it also calculates heat, $Q_{REACT}$, that is generated by chemical reactions with the individual ones of the exhaust gases as they passes through the exhaust system component 301.

Some components comprising a catalytic substrate may be electrically heated in the warm up phase when the engine is cold and there is a need to reduce catalysts light-off time. Consequently the model may also take heat, $Q_{EL}$, received by electrical heating into account.

The calculations for each submodule are repeatedly performed so that changes in temperature of gases and substrates of the components are calculated in real-time. Each repetition of the calculations for modelling an exhaust system component uses a previously calculated temperature of its substrate. It will be appreciated that the substrate of an exhaust system component may gain or lose temperature due to convection from exhaust gases, chemical reactions and heat conduction to surrounding materials. From the rates of change of heat received and lost by the substrate, the mathematical model may calculate a rate of increase in temperature of the substrate and/or calculate an increase in temperature of the substrate ($\Delta T_b$) in a defined period of time (for example 100 ms) corresponding to the repetition of the calculation. By adding the increase in temperature to an existing temperature, a new substrate temperature may be calculated that may then be used in a next repetition of the calculation for the submodule.

Equations that may be used by the processing means to model the gas phase within a catalytic exhaust system component, such as the first component 104, are shown in FIG. 4. Equation 1

$$\left(\rho_g C_{pg} v_g \frac{\partial T_g}{\partial x} = -h \cdot \frac{Sf}{\varepsilon} \cdot (T_g - T_b) + \dot{Q}_{react}\right)$$

equates (on the left hand side of the equation) heat gained by the exhaust gases as they pass through the component against (on the right hand side of the equation) rate of heat transferred from the gases to the substrate of the component plus the rate at which heat is added ($\dot{Q}_{react}$) to the exhaust gases by chemical reactions.

The calculation of the exhaust gas temperature is performed via the equations of FIG. 4, which take into account the geometry of the catalyst, in particular the channel shape and catalyst type, and heat transfer from the gas to the solid substrate. From Equation 1 the rate of change of the temperature of the gas in respect to the length, x, of the catalyst may be determined. On left hand side of Equation 1, $\rho_g$ represents the density of the gas (as a function of temperature), $C_{pg}$ is the specific heat capacity of the gas, $v_g$ is the velocity of the gas (determined as a function of geometry and mass flow rate). The right hand side of the equation is comprised of the heat transfer coefficient of the gas to the catalytic substrate (h), the temperature difference between the gas and the substrate ($T_g, T_b$ respectively), the heat of reaction obtained from the exothermic reactions ($\dot{Q}_{react}$, determined in the chemical kinetics model) and a ratio between the shape factor of the substrate and its void fraction $$\left(\frac{Sf}{\varepsilon}\right).$$

The latter term $$\left(\frac{Sf}{\varepsilon}\right)$$

describes the total area where heat is exchanged between the gas and substrate, by taking into account the washcoat coating (which reduces the inlet area of the substrate) and the shape of the channels (square, hexagonal, etc.).

The heat transfer coefficient may be determined via Equation 2, ($h=Nu\cdot\lambda_g/d_h$) where Nu represents the dynamic Nusselt number, $\lambda_g$ the gas conductivity and $d_h$ the hydraulic diameter of the cell. The Nusselt number may be calculated via Equations 3-5, which take into account the shape of the channel for the laminar Nusselt number ($Nu_L$). In Equations 3 ($Nu=Nu_L\cdot[(1+n1)^{bh}-bh\cdot n1\cdot(1+n1)^{bh-1}])$ and 4 ($n1=ah/G_{zD}$), ah is equal to 0.095 and bh equal to 0.45, where ah and bh are the Hawthorne local correction parameters. Equation 1 is part of a system of equations that close the energy balance. The temperature of the substrate is computed from equation 6 which will be discussed in the following section.

Using Equation 1, the processing means is able to determine the rate of change of the gas temperature ($\partial T_g/\partial x$) over a control "volume". In an embodiment, the volume may include the entire length of a catalyst, in which case the change in temperature of the exhaust gases across the exhaust system component may be calculated by multiplying the rate of change of the gas temperature ($\partial T_g/\partial x$) by the length of the catalyst. Alternatively, the model may discretize the equation over a number of smaller elements to increase accuracy (but also increase computational effort).

Equations that may be used by the processing means to model the solid phase within a wall-flow or through-flow catalytic exhaust system component, such as components 104, 109, 201 are shown in FIG. 5. Equation 6

$$\left(\rho_b\cdot C_{pb}\cdot\frac{\partial T_b}{\partial t}=\lambda_{b,x}\frac{\partial^2 T_b}{\partial x^2}+\lambda_{b,y}\frac{\partial^2 T_b}{\partial y^2}+\dot{Q}_{conv}+\dot{Q}_{react}+\dot{Q}_{el}\right)$$

equates the rate of increase in heat contained in the substrate with the rate of heat lost from the substrate by conduction to surrounding material (such as insulation) plus the rate of heat gained by convection from the exhaust gases plus the rate of heat produced by chemical reactions plus any rate of heat added by electrical heating.

The temperature of the substrate, insulation and canning can be determined using Equation 6, albeit applied independently to each subcomponent. In the interest of brevity, only the calculation of the substrate temperature will be explained here. The temperature of the substrate is dependent on a large number of factors and heat transfer mechanisms.

In the case of a through-flow catalyst the substrate and washcoat heat capacity may be taken into account, the specific heat capacity of the whole solid ($C_{pb}$) being a function of the constituent elements of the solid.

In accordance with Equation 7 ($\rho_b=\rho_w\cdot\varepsilon_w+\rho_c\cdot\varepsilon_c$) the density of the solid of the catalyst is equal to product of the density of the washcoat material, $\rho_w$ and the volume fraction of the washcoat material, $\varepsilon_W$, added to the product of the density of the substrate material, $\rho_c$, and the volume fraction of the substrate material, $\rho_c$. At Equation 8, ($\rho_c\cdot\varepsilon_c=\underline{m_c}$) the product of the density of the substrate material, $\rho_c$, and the volume fraction of the substrate material, $\rho_c$ are equal to the washcoat loading $\underline{m_c}$.

Thus, as shown in Equation 9 ($\rho_b\cdot C_{pb}=\rho_w\cdot\varepsilon_w\cdot C_{pw}+C_{pc}\cdot\varepsilon_c\cdot\rho_c$), by considering all constituent parts, the heat capacity of the solid for a through flow catalyst may be found as the sum of the heat capacity of the substrate added to the heat capacity of the washcoat. $\rho_w$ denotes density of the washcoat material, $\varepsilon_w$ denotes volume fraction of the washcoat material and $C_{pw}$ denotes the specific heat capacity of the washcoat. Similarly $\rho_c$ denotes density of the substrate material, $\pounds_c$ denotes volume fraction of the substrate material and $C_{pc}$ denotes the specific heat capacity of the substrate material.

Returning to Equation 6, it will be apparent that the rate of change of the temperature in respect to time $$\left(\frac{\partial T_b}{\partial t}\right)$$

is a function of the solid mass and other heat flows. The right-hand side of the equation is composed of the heat conducted through the catalyst axially $$\left(\lambda_{b,x}\frac{\partial^2 T_b}{\partial x^2}\right),$$

heat conducted through the catalyst from the center to the periphery $$\left(\lambda_{b,y}\frac{\partial^2 T_b}{\partial y^2}\right),$$

as well as heat exchanged via convection ($\sqrt{\dot{Q}_{conv}}$), heat of reaction ($\sqrt{\dot{Q}_{react}}$) and electrical heating ($\dot{Q}_{el}$) (where present). $\lambda_{b,x}$ and $\lambda_{b,y}$ are the thermal conductivity of the catalyst in the axial and radial directions respectively. The convective heat transfer is described in Equation 11 ($Q=h\cdot S_F\cdot(T_g-T_b)$) and explained above in respect of Equation 1, whilst the heat of reaction ($\dot{Q}_{react}$) will be described below with reference to FIG. 6.

Using Equation 6 of FIG. 5, the processing means 102 may calculate the increase in the substrate temperature during a defined time period. This may be achieved by calculating the sum of the terms on the right hand side of Equation 6 and dividing by the heat capacity to obtain the rate of change of the temperature in respect to time ($\partial T_b/\partial t$) and then multiplying this rate of change of temperature by the defined time period.

Equations that may be used by the processing means 102 to model the chemical reactions taking place in exhaust system components, such as component 104, are shown in FIG. 6. The chemical model solves the Arrhenius Equations for specific exhaust gas species to calculate the reaction rate, heat released, and the molar/mass balance. The general Arrhenius equation (14) is used for all species considered in the model, with specific pre-exponential factors (A) and activation energy (E) for each pollutant. Equation 14 ($K(t)=A\cdot\exp(-E/(RT))$) is completed by the temperature of the substrate (T), obtained from Equation 6 and the specific gas constant R. This allows the calculation of the Arrhenius term K(t) which is then multiplied by the concentration of the species being converted ($[C_A]$) to calculate the reaction rate of the species ($R_k$), as shown in Equation 13 ($R_k=K(t)\cdot[C_A]$). The heat of reaction obtained from all of the species is obtained from Equation 12 ($Q_{react}=SF \cdot \Sigma_K(R_k dH_k)$), where the shape factor of the catalyst (SF) is multiplied by the sum of heat released for each individual species ($\Sigma_K(R_k dH_k)$). Here $dH_k$ represents the rate of heat of reaction obtained from the conversion of a mole of each k species. Once the heat of reaction is determined, it can be used to complete the calculation of the substrate and gas temperatures (using Equations 1 and 6), as well as determining the efficiency of the catalytic process via the reaction rate.

Equations that may be used by the processing means 102 to model pressure drops across exhaust system components, such as component 104, are shown in FIG. 7. Each component of the exhaust system may be accompanied by a set of equations that allow the calculation of a pressure drop across the flow-through or wall-through catalysts. Factors that may be taken into account are the channel pressure drop, given by Equations 15

$$\left( \frac{dP}{dt} = -\frac{28.5 \cdot \mu \cdot v_g}{d_h^2} \right)$$

and 16 ($v_g = mfr/(\rho_g \cdot A_{monolith} \cdot \varepsilon)$), the sudden contraction and expansion pressure drop, $\Delta P_{contraction}$ and $\Delta P_{expantion}$, as shown in Equations 17 ($\Delta P_{contraction}=(1.1-0.4 \cdot C_x) \cdot (\rho_g \cdot v_g)^2/2$), 18 ($\Delta P_{expantion}=(1-C_x) \cdot (\rho_g \cdot v_g)^2/2$) and 19

$$\left( C_x = \frac{d_h^2}{2 \cdot (d+w_w)^2} \right)$$

and the inlet/outlet diffuser pressure drop, $\Delta P_{diffuser}$, as shown in Equation 20 ($\Delta P_{diffuser}=(1-A_{in}/A_{out})^2 \cdot mfr^2/(\rho_{in} \cdot A_{sec}^2)$). All of these pressure losses may then be summed to provide an accurate calculation of the overall pressure drop across the component. In addition, for wall-flow catalysts Darcy pressure drop may be taken into account. The Darcy pressure drop is not illustrated in FIG. 7 but it is well known in the art.

In the equations of FIG. 7, $\mu$ is dynamic viscosity; $v_g$ is velocity of gas; $d_h$ is hydraulic diameter; mfr is mass flow rate; $\rho_g$ is density of gas; $A_{monolith}$ is hydraulic diameter of the substrate cell; $\varepsilon$ is void fraction of coated monolith; $C_x$ is calibration parameter (normally 1); d is total diameter of the substrate cell; $w_w$ is substrate wall thickness; $A_{in}$ is total inlet area of the monolith; $A_{out}$ is total outlet of the monolith; and $A_{sec}$ is area of the section where a specific calculation is performed.

As previously mentioned, the processing means 102 may be configured to calculate a correction of the approximated value of temperatures of gases entering the DPF 109 in dependence on the third signal received from a temperature sensing means located downstream of the DPF. The corrected temperature may be determined by calculating a rate of loss of heat from the exhaust gases during passage of the exhaust gases through the DPF 109. An equation that may be used by the processor 113 to determine a rate of change of the temperature $$\left( \frac{\partial T_{IN}}{\partial t} \right)$$

at the inlet of the DPF is shown as Equation 23

$$\left( \frac{\partial T_{IN}}{\partial t} = \frac{\partial T_{OUT}}{\partial t} + \frac{\partial \left( \frac{\dot{Q}}{\dot{m} \cdot c_p} \right)}{\partial t} \right)$$

in FIG. 8. As illustrated, the rate of change of the temperature $$\left( \frac{\partial T_{IN}}{\partial t} \right)$$

at the inlet is equal to the rate of change of the temperature $$\left( \frac{\partial T_{OUT}}{\partial t} \right)$$

at the outlet plus a neat flux rate $$\frac{\partial \left( \frac{\dot{Q}}{\dot{m} \cdot c_p} \right)}{\partial t}$$

that may be calculated at each time step of the mathematical model. (Here $\dot{Q}$ represents all heat sources and sinks into and out of the DPF control volume, $\dot{m}$ represents the mass flow rate through the DPF and $C_p$ represents the heat capacity of the exhaust gases.)

As mentioned, the mathematical model uses the exhaust gas temperature sensor 103 upstream of a turbocharger (108 in FIGS. 1 and 2) as one of the inlet boundary conditions, whilst a temperature sensor 118 downstream of the DPF may be used as a means of correcting the overall temperature profile. The system 106, 106A is able to operate without a temperature sensor between the turbocharger 108 and the LNT 104 (or a DOC in the position of the LNT) because a turbine numerical model may be used by the processor 113 to compute the heat losses and the pressure drop across the turbocharger. The turbocharger may be modelled with a pipe model and the energy balance may be solved using the equations of FIG. 9.

In Equation 24

$$\left( T_{OUT} = \frac{\dot{m} \cdot Cp \cdot T_{IN} - h_{EG,Pipe} \cdot A \cdot (T_{IN} - T_{wall})}{\dot{m} \cdot Cp} \right).$$

$\dot{m}$ is the mass flow in the pipe, Cp is the gas heat capacity, A is the surface area of the pipe wall and $h_{EG,Pipe}$ is the heat transfer coefficient between the gas and the pipe wall. Calculation of the heat transfer coefficient may be performed via Equation 25

$$\left( h_{EG,Pipe} = \frac{Nu_{EG} \cdot k_{EG}}{d} \right),$$

where d is the diameter of the pipe, $Nu_{EG}$ represents the in pipe Nusselt number, whilst $k_{EG}$ is the thermal conductivity of the exhaust gas inside the pipe. $T_{IN}$ and $T_{OUT}$ are the temperatures of gases at the inlet and outlet of the turbocharger respectively and $T_{wall}$ is the temperature of the wall of the turbocharger.

Furthermore, the energy balance may be completed by calculating the temperature of the wall as illustrated in Equation 26

$$\left( T_{Wall,t=t} = K_I \cdot \frac{\dot{Q}_{EG,Pipe} - \dot{Q}_{Pipe,Env}}{m \cdot Cp} \cdot dt + T_{Wall,t=t-1} \right),$$

performed via discrete integration, where $K_I$ is the integral gain. $\dot{Q}_{EG,Pipe}$ and $\dot{Q}_{Pipe,Env}$ represent the heat energy flowing from the exhaust gas into the pipe wall, and the pipe wall into the environment, respectively, and are determined via Equations 27 ($\dot{Q}_{Pipe,Env} = h_{Pipe,Env} \cdot A \cdot (T_{wall} - T_{Env})$) and 28 ($\dot{Q}_{EG,Pipe} = h_{EG,Pipe} \cdot A \cdot (T_{in} - T_{wall})$). $h_{Pipe,Env}$ denotes the heat transfer coefficient between the pipe wall and the surrounding environment.

A flow chart of a method 1000 for controlling injection in a diesel engine is shown in FIG. 10. The method 1000 may be performed by the processor 113 of FIG. 1 or FIG. 2. The method 1000 comprises receiving a first signal from a first temperature sensor indicative of a first temperature of exhaust gases outputted from a diesel engine at a first location upstream of a first exhaust system component configured to provide a passage for exhaust gases, at block 1001. For example, the first signal may be a signal provided by the temperature sensing means 103 of FIG. 1 or 2, and the first exhaust system component may be the LNT 104 of system 106 or 106A.

The method 1000 also comprises, at block 1002, receiving a second signal from a flow rate sensor indicative of a flow rate of the exhaust gases outputted from a diesel engine. For example, the second signal may be provided by the flow rate sensor 105 of FIG. 1 or 2. As noted above, the flow rate sensor 105 may be located on the input side of the engine, but it provides a signal indicative of the flow rate of exhaust gases outputted from the engine. For example, the mass flow rate from the engine may be calculated from the mass flow rate into the engine using know methods.

The method 1000 also comprises, at block 1003, calculating an approximated value from the first signal and the second signal, the approximated value being indicative of a second temperature of exhaust gases downstream of the first exhaust system component. The second temperature may be an approximation of exhaust gas temperature at a location between the LNT 104 and the DPF 109 of FIG. 1 or 2, but could alternatively be an approximation of exhaust gas temperature at a location downstream of the DPF or upstream of the LNT. (In the latter case the first exhaust system component 104 may be the turbocharger 108.)

The method 1000 also comprises, at block 1004, providing an output signal to control at least one diesel injector in dependence of the calculated approximated value. For example, the diesel injectors 111 of engine 101 may be controlled in dependence of the calculated approximated value to provide a diesel flow rate to provide a rich mixture for regenerating a DPF or an LNT.

An example of processes that may be performed within the block 1003 is shown in the flow chart of FIG. 11. At block 1101, the method 1000 includes calculating a rate of heat loss from the exhaust gases during the passage of the exhaust gases through the first exhaust system component. For example, this may be achieved as described above with reference to Equation 1 of FIG. 4.

As illustrated in FIG. 12, the process of block 1101 may comprise calculating a rate of heat loss from the exhaust gases to a substrate of the first exhaust system component during the passage of the exhaust gases through the first exhaust system component (as shown at block 1201). For example, the rate of heat loss to the substrate may be calculated as described above with reference to the right hand side of Equation 1. It may also comprise (as shown at block 1202) calculating a rate at which heat is conducted away from the substrate to surrounding material, as described with regard to Equation 6 of FIG. 5.

Returning to FIG. 11, the method 1000 may also comprise, at block 1102, calculating a rate of heat generated by chemical reactions during the passage of the exhaust gases through the first exhaust system component. For example, this may be performed as described with regard to the equations of FIG. 6.

The method 1000 may also comprise, at block 1103, calculating concentrations of component gases leaving the first exhaust system component. For example, this may also be performed as described with regard to the equations of FIG. 6.

The method 1000 may also comprise, at block 1104, calculating a drop in pressure in the exhaust gases between the pressure of gases at an inlet of the first exhaust system component and an outlet of the first exhaust system component. For example, this may be performed as described making use of one or more of the equations of FIG. 7.

The method 1000 may be applied to a system in which two or more exhaust system components exist between a location of a measured temperature and a location for which the approximated value of temperature is calculated in order to control diesel injection. For example, in the system of FIG. 1, both a turbocharger 108 and an LNT exist between the location of the temperature sensor 103 and a location between the LNT and the DPF for which an approximated value may be required. In such cases the block 1003 of method 1000 may include the processes of FIG. 13. Here the method 1000 includes calculating an intermediate value from the first signal and the second signal, the intermediate value being indicative of an intermediate temperature of exhaust gases at a location downstream of a second exhaust system component and upstream of the first exhaust system component, at block 1301. Then at block 1302 the method includes calculating the approximated value indicative of second temperature from the intermediate temperature.

The method 1000 may also comprise the processes shown in FIG. 14 to improve the accuracy of the approximated value for the second temperature. The processes of FIG. 14 may be performed periodically in addition to blocks 1001 to 1004, to periodically improve the accuracy of the approximated value for the second temperature. The processes of FIG. 14 may be performed with the same or less frequency than the blocks of FIG. 10.

At block 1401 of FIG. 14 a third signal is received indicative of a third temperature of exhaust gases downstream of a further exhaust system component, the third exhaust system component being arranged downstream of the first exhaust system component. At block 1402 the method includes calculating a correction of the approximated value in dependence on the third signal. For example, as described with reference to FIGS. 1 and 2, the third signal may be provided by a temperature sensor 118 located downstream of a DPF 109 in order to correct an approximated value of temperature of gases entering the DPF. This process of correction may be performed as described above with reference to FIG. 8, in which the calculation comprised calculating a rate of loss of heat from the exhaust gases during passage of the exhaust gases through the further exhaust system component. (For example, the rate of loss of heat from the exhaust gases during their passage through the DPF may be calculated.)

For purposes of this disclosure, it is to be understood that the processing means described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

As used here 'module' refers to a portion of software that, with other modules are used to produce a complete mathematical model of an exhaust system. Each module, typically corresponds to a single component of the exhaust system.

The blocks illustrated in the FIGS. 10 to 14 may represent steps in a method and/or sections of code in the computer program 151. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for controlling an aftertreatment system of an internal combustion engine, the apparatus comprising an electronic processor having an electrical input and an electronic memory device electrically coupled to the electronic processor and having instructions stored therein, the electrical processor being configured to:
    receive a first signal from a first temperature sensor, the first signal being indicative of a first temperature of exhaust gases outputted from an internal combustion engine at a first location upstream of a first exhaust system component configured to provide a passage for exhaust gases;
    receive a second signal from a flow rate sensor, the second signal being indicative of a flow rate of the exhaust gases outputted from the engine;
    calculate an approximated value at least from the first signal and the second signal, the approximated value being indicative of a second temperature of exhaust gases at a location downstream of the first exhaust system component;
    provide an output signal to control the aftertreatment system, based on the calculated approximated value;
    access the memory device and execute the instructions stored therein such that it is operable to receive the first and second signals and calculate the approximated value indicative of the second temperature;
    receive a third signal indicative of a third temperature of exhaust gases downstream of a further exhaust system component, the further exhaust system component being arranged downstream of the first exhaust system component; and
    calculate a correction of the approximated value based at least in part on the third signal.

2. An apparatus according to claim 1, wherein the output signal is provided to a fuel injector to control a rate of fuel injection and further wherein the electronic processor is further configured to access the memory device and execute the instructions stored therein such that it is operable to control the fuel injector.

3. An apparatus according to claim 1, wherein the electronic processor is further configured to determine a drop in pressure in the exhaust gases between an inlet of the first exhaust system component and an outlet of the first exhaust system component.

4. A system for treatment of exhaust gases from a diesel engine, the system comprising the apparatus of claim 1 and a plurality of exhaust system components configured to provide a passage for the exhaust gases, wherein the plurality of exhaust system components includes the first exhaust system component.

5. A vehicle comprising a diesel engine and a system in accordance with claim 1.

6. An apparatus according to claim 1, wherein the electronic processor is further configured to calculate a rate of heat loss from the exhaust gases during the passage of the exhaust gases through the first exhaust system component.

7. An apparatus according to claim 6, wherein the electronic processor is further configured to calculate a rate of heat loss from the exhaust gases to a substrate of the first exhaust system component during the passage of the exhaust gases through the first exhaust system component, wherein optionally the electronic processor is configured to calculate a rate of heat loss from the exhaust gases to the substrate in dependence upon a stored value for the heat transfer coefficient.

8. An apparatus according to claim 1, wherein the electronic processor is further configured to:
calculate an intermediate value from the first signal and the second signal, the intermediate value being indicative of an intermediate temperature of exhaust gases at a location downstream of a second exhaust system component and upstream of the first exhaust system component; and
calculate the approximated value indicative of second temperature based at least in part on the intermediate value.

9. An apparatus according to claim 1, wherein the correction of the approximated value is determined by calculating a rate of loss of heat from the exhaust gases during passage of the exhaust gases through the further exhaust system component.

10. An apparatus according to claim 1, wherein the electronic processor is further configured to calculate the correction of the approximated value by determining a rate of change of the temperature at the inlet to the further exhaust system component from a rate of change of the temperature at the outlet of the further exhaust system component and a heat flux rate based on heat sources providing heat to the further exhaust system component and heat sinks from the further exhaust system component.

11. An apparatus according to claim 1, wherein the electronic processor is further configured to calculate the approximated value periodically at a first frequency and to calculate the correction periodically less frequently.

12. An apparatus according to claim 1, wherein the electronic processor is further configured to receive a stored value of a concentration for each one of a plurality of exhaust gas species and calculate a rate of heat generated by chemical reactions of the exhaust gas species during the passage of the exhaust gases through the first exhaust system component.

13. A method for controlling exhaust gas aftertreatment for an internal combustion engine, the method comprising:
receiving a first signal from a first temperature sensor, the first signal being indicative of a first temperature of exhaust gases outputted from an internal combustion engine at a first location upstream of a first exhaust system component configured to provide a passage for exhaust gases;
receiving a second signal from a flow rate sensor, the second signal being indicative of a flow rate of the exhaust gases outputted from the engine;
calculating an approximated value at least from the first signal and the second signal, the approximated value being indicative of a second temperature of exhaust gases downstream of the first exhaust system component;
providing an output signal to control exhaust gas aftertreatment in dependence of the calculated approximated value; and
receiving a third signal indicative of a third temperature of exhaust gases downstream of a further exhaust system component, the third exhaust system component being arranged downstream of the first exhaust system component, and calculating a correction of the approximated value based at least in part on the third signal.

14. A method according to claim 13, wherein the output signal is provided to a fuel injector to control a rate of fuel injection.

15. A method according to claim 13, wherein the calculating the approximated value comprises calculating a drop in pressure in the exhaust gases between the pressure of gases at an inlet of the first exhaust system component and an outlet of the first exhaust system component.

16. A method according to claim 13, wherein the calculating comprises calculating a rate of heat loss from the exhaust gases during the passage of the exhaust gases through the first exhaust system component.

17. A method according to claim 16, wherein the calculating comprises calculating a rate of heat loss from the exhaust gases to a substrate of the first exhaust system component during the passage of the exhaust gases through the first exhaust system component, wherein optionally the calculating comprises calculating a rate of heat generated by chemical reactions during the passage of the exhaust gases through the first exhaust system component.

18. A method according to claim 13, wherein the calculating comprises:
calculating an intermediate value from the first signal and the second signal, the intermediate value being indicative of an intermediate temperature of exhaust gases at a location downstream of a second exhaust system component and upstream of the first exhaust system component; and
calculating the approximated value indicative of second temperature based at least in part on the intermediate temperature.

19. A method according to claim 13, wherein the calculating a correction comprises calculating a rate of loss of heat from the exhaust gases during passage of the exhaust gases through the further exhaust system component.

20. A method according to claim 13, further comprising receiving a stored value of a concentration for each one of a plurality of exhaust gas species and calculating a rate of heat generated by chemical reactions of the exhaust gas species during the passage of the exhaust gases through the first exhaust system component.

* * * * *